INVENTORS
CARL W. ZIMMERMAN
ROBERT O. WILSON

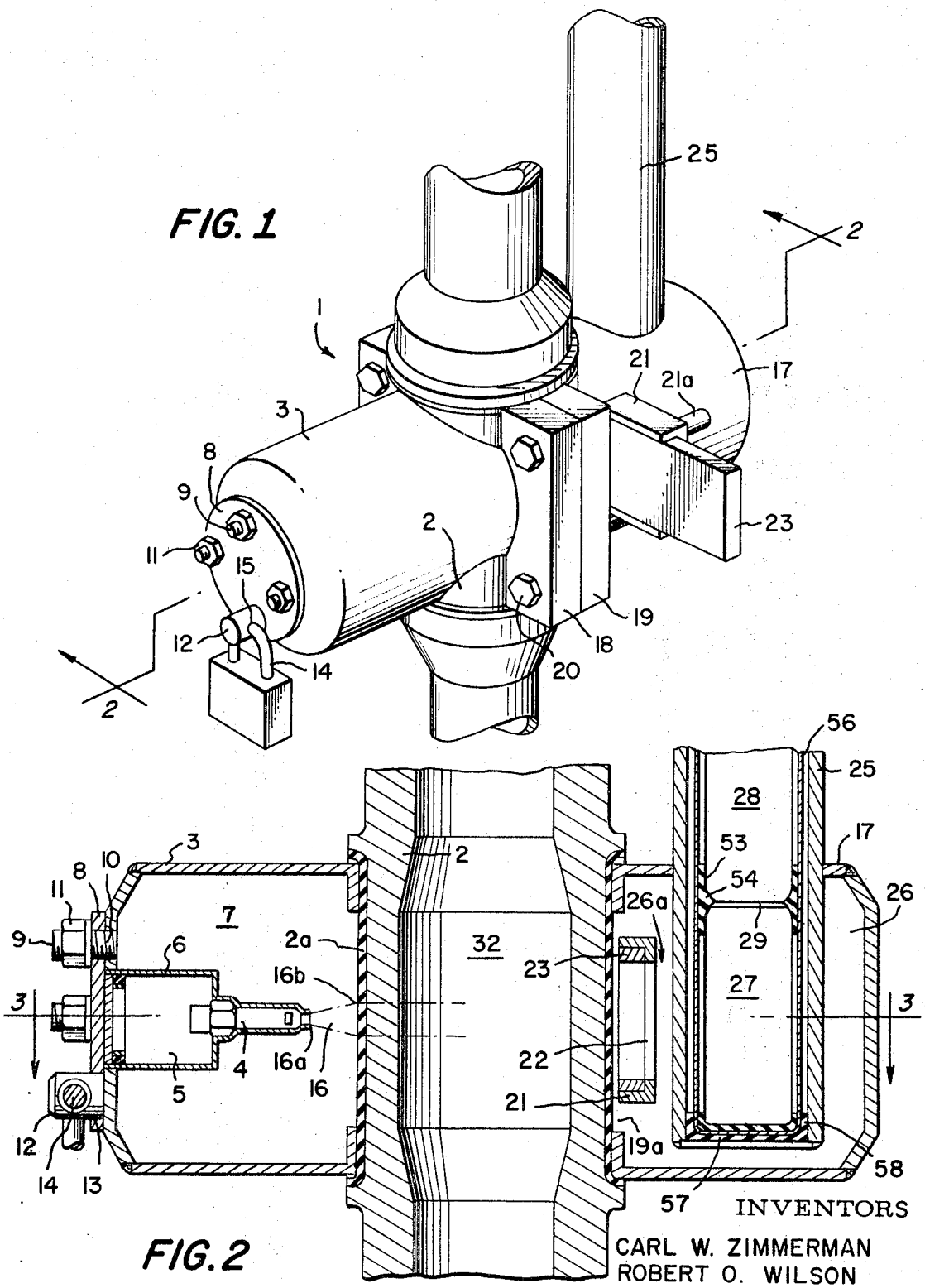

BY Burns, Doane, Benedict,
Swecker & Mathis
ATTORNEYS

Sept. 15, 1970  C. W. ZIMMERMAN ET AL  3,529,153
METHODS AND APPARATUS FOR MEASURING SLURRY
DENSITY WITH GAMMA RAYS
Filed May 15, 1968  4 Sheets-Sheet 1

INVENTORS
CARL W. ZIMMERMAN
ROBERT O. WILSON

BY Burns, Doane, Benedict,
Swecker + Mathis
ATTORNEYS

United States Patent Office 3,529,153
Patented Sept. 15, 1970

1

3,529,153
METHODS AND APPARATUS FOR MEASURING SLURRY DENSITY WITH GAMMA RAYS
Carl W. Zimmerman and Robert O. Wilson, Duncan, Okla., assignors to Halliburton Company, Duncan, Okla., a corporation of Delaware
Filed May 15, 1968, Ser. No. 729,291
Int. Cl. G01n 23/12
U.S. Cl. 250—43.5                                   11 Claims

ABSTRACT OF THE DISCLOSURE

Method and apparatus for measuring the density of a slurry including diverse solid materials. One solid material has a cation having an atomic number on the order of 38 or higher, while another solid material has a cation with an appreciably lower atomic number. High energy primary photons are passed through the slurry. Low energy photons generated by multiple Compton scatterings are substantially blocked or attenuated as they issue from the slurry. The photons which successfully penetrate the blocking and attenuation are impinged upon scintillation counting means. The discrimination level of the scintillation counting means is adjusted to detect photons having an energy level substantially lower than that of the primary photons which impinge upon the scintillation counting means and maintain maximum operating stability for the scintillation counting means.

---

Figure 3:
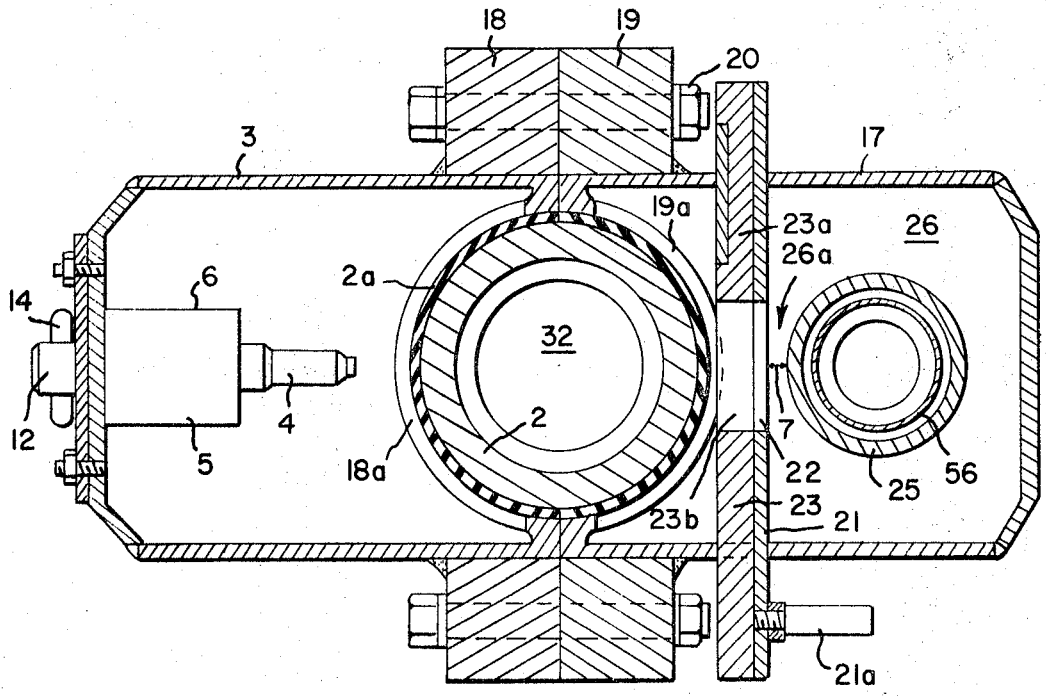

A rotary calibration apparatus for use in a nuclear densitometer including a plug whose movement is controlled by T-slot means and which is operable, depending upon its association in relation to the T-slot means, to position a collimating passage or either of two different shielding barriers in alignment with a window between a photon source and a slurry whose density is to be measured.

GENERAL BACKGROUND, OBJECTS AND SUMMARY OF INVENTION

The use of nuclear densitometers to measure the density of slurries has long been recognized. However, in certain industrial applications, unique problems are presented because of the nature of the slurries whose density is to be measured.

In the well drilling and completion art, it is often desirable to monitor or measure the density of cement slurries or mud slurries. However, where weighting agents such as barium sulphate, strontium sulphate or other solid materials which have a cation of high atomic numbers are utilized, difficulties have been encountered in maintaining accuracy.

It has been recognized, for example, that where high concentrations of barites are introduced in drilling muds and cement slurries, errors or diversions in density readings on the order of 15% may be realized unless the densitometer instruments are recalibrated, each time there is a significant change in barite concentration. This error potential is discussed, for example, in a paper entitled "Radioactive Measurement of Fluid Density" presented by D. G. Hartwig at the Petroleum Mechanical Engineering Conference in New Orleans, La., in September of 1960.

Other problems involved in the field use of nuclear

2 densitometers have related to the weight of such units. Many densitometers heretofore commercially available and suitable for use in the drilling industry have weighed as much as 300 pounds. Obviously, units weighing this much are difficult to transport, manipulate and install in the field.

Recognizing the need for improved nuclear densitometer techniques, it is a principal object of the invention to provide an improved method and apparatus for measuring slurry density which maintains high accuracy without requiring recalibration for the addition of constituents having high atomic numbers.

It is a further object of the invention to minimize errors in density measurements which might otherwise be engendered by multiple Compton scattering and photoelectric absorption phenomena.

It is also an object of the invention to provide an improved method and apparatus which is characterized by optimum stability in photon counting.

Yet another object of the invention is to provide such an improved apparatus which is characterized by extreme light weight so as to enable the unit to be easily handled in the field.

A still further object of the invention is to provide an improved and uniquely reliable apparatus for performing calibration operations.

In accomplishing at least some of the foregoing objects, there is presented through this invention a method of measuring the density of a slurry involving the positioning of a source of photons having a photon energy level of between about .6 and about 2 m.e.v. adjacent a vertical flow of a slurry. The slurry comprises diverse solid materials with one solid material of the slurry having a cation with an atomic number on the order of 38 or higher, and another solid material having a cation with a substantially lower atomic number. The emission of photons from the source en route to the slurry is collimated. The passage of photons issuing from the slurry which have a photon energy level of less than about .3 m.e.v. is substantially blocked. The passage of photons issuing from the slurry having a photon energy level of less than about .45 m.e.v. is attenuated by at least twice the degree of attenuation of photons issuing from the slurry which have a photon energy level about .6 m.e.v. or greater. Photons which have been subjected to this blocking or attenuating are impinged on a scintallation counting means. The discrimination level of the scintillation counting means is maintained at least as low as about .05 m.e.v.

An independently significant aspect of the invention resides in apparatus operable to accomplish the foregoing methods.

Another independently significant aspect of the invention resides in a calibration apparatus characterized by a plug whose movement is controlled by T-slot means. The plug is operable, depending upon its position in relation to the T-slot means, to position a collimating passage or one of two diverse calibration shields in alignment with a window interposed between a photon source and a slurry whose density is to be measured.

DRAWINGS

In describing the invention, reference will be made to preferred embodiments shown in the appended drawings.

Figure 4:
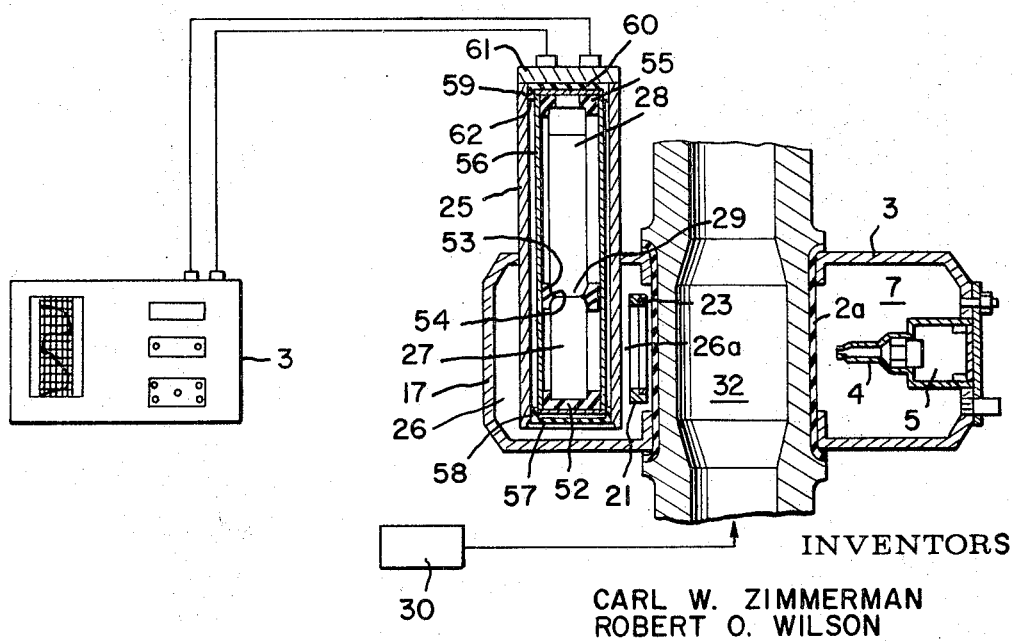
Figure 5:
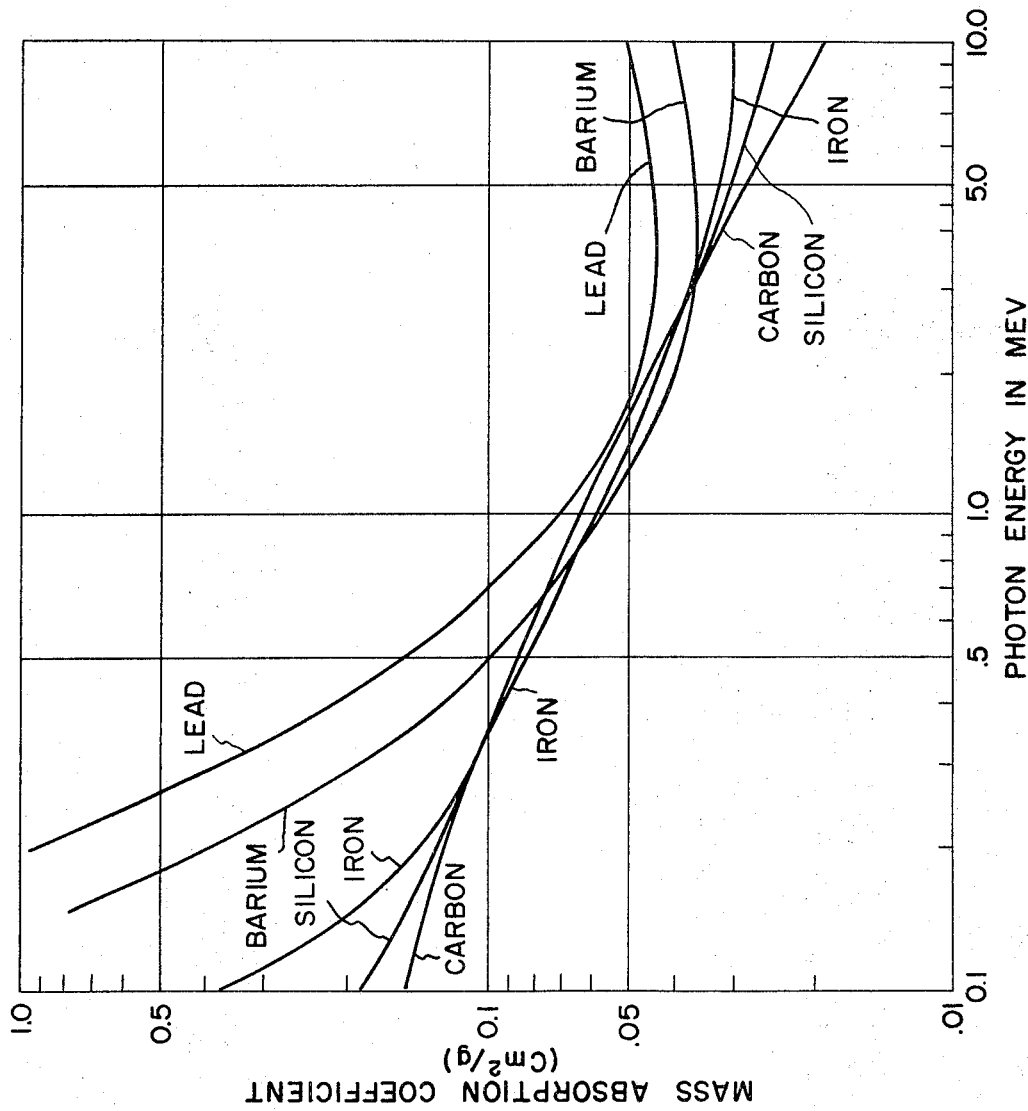
Figure 6:
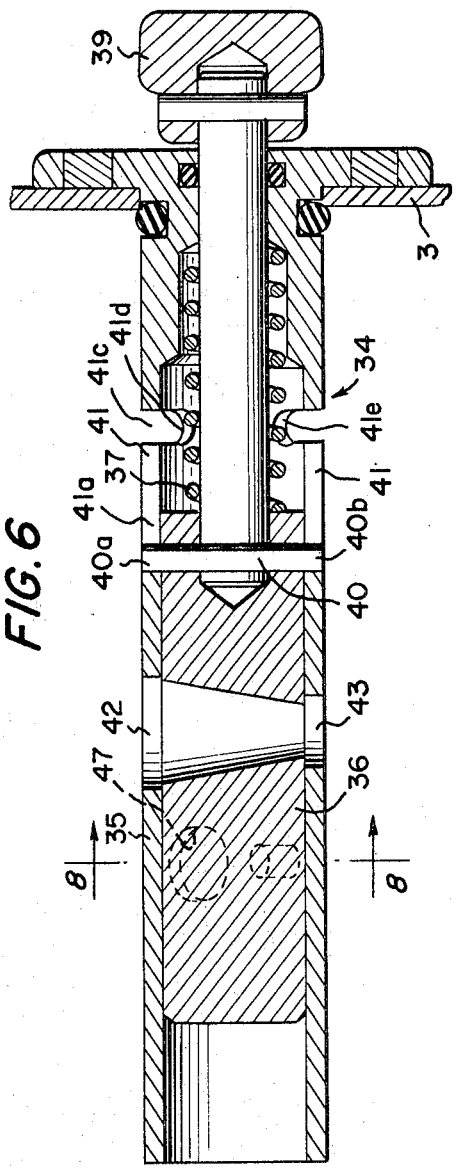
Figure 7:
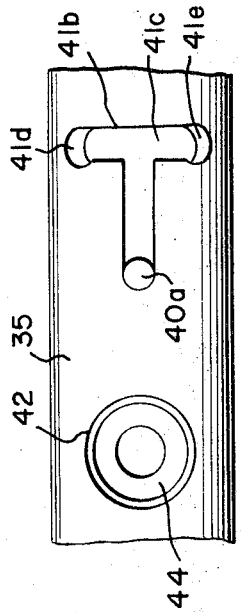
Figure 8:
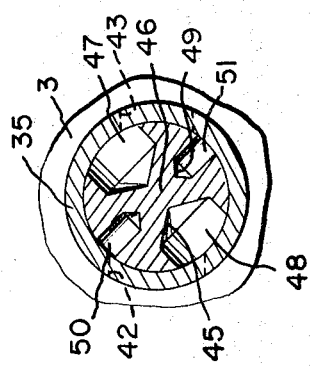

In the drawings:

FIG. 1 provides, in perspective format, an external view, partially broken away, of the nuclear densitometer of the present invention;

FIG. 2 provides an enlarged, vertical sectional view of the FIG. 1 illustration;

FIG. 3 provides a transverse sectional view of the FIG. 1 installation in an enlarged format, as viewed along the section line 3—3 of FIG. 2;

FIG. 4 provides an an overall schematic view of the FIG. 1 installation in combination with its associated instrumentation;

FIG. 5 provides a graph reflecting differences in degree of photon absorption for elements with different atomic numbers as the elements are subjected to different levels of photon energy bombardment;

FIG. 6 provides a transverse sectional view of a preferred calibration device which may be incorporated in the FIG. 1 apparatus;

FIG. 7 provides a plan view of the external portion of a cylindrical housing of the FIG. 6 calibration apparatus, illustrating a T-slot configuration which serves to regulate the position of the calibrating apparatus; and FIG. 8 provides a transverse sectional view of a portion of the plug of the FIG. 6 calibration apparatus which is operable to provide two different calibration shield structures.

OVERALL STRUCTURE OF GAMMA RAY DENSITOMETER

FIGS. 1 through 4 illustrate the principal structural details of a nuclear densitometer 1 fabricated in accordance with the teachings of the present invention.

Densitometer 1 is mounted on a vertically extending conduit 2. A first housing 3 is mounted on one side of the conduit 2. Contained within housing 3 is a source 4 of high energy gamma rays. This source is mounted on a shielding plug 5 so as to be movable into and out of a recess 6 formed in a mass 7 of shielding material which fills the interior of the housing 3. Shield plug 5 and source 4 are mounted on a plate 8 which is detachably secured to the housing 3. This detachable securing is effected by a plurality of threaded studs 9 which project through apertures 10 in the plate 8. The plate 8 is removably secured on the studs 10 by means of threaded nut, fasteners 11.

A conventional safety securing arrangement is also provided. This arrangement includes a stud 12 projecting from the housing 3, through a plate aperture 13. A padlock 14 intersects an aperture 15 in the stud 12 to positively prevent removal of the plate 8 and its associated gamma ray source 4.

As shown in FIG. 2, a frustoconical collimating passage 16 is formed in the shielding mass 7 and is directed axially toward the central, vertical axis of the conduit 2.

A second housing 17 is carried on a side of the conduit 2 opposite to that where the housing 3 is located. Flanges 18 and 19 mounted on housings 3 and 17, respectively, and recessed to conform to the cylindrical periphery of the conduit 2, provide mounting means for detachably securing the housings 3 and 17 on the conduit 2. The flanges 18 and 19 may be detachably interconnected by threaded fastening means 20, as schematically shown.

Flange 18 and housing 3 are rigidly interconnected by conventional means such as welding. Flange 19 and housing 17 are similarly interconnected.

Flange 18 is provided with a window 18a which is axially aligned with the collimating passage 16. Similarly, flange 19 is provided with a window 19a which is also aligned with the axis of the collimating passage 16. A cylindrical, resilient mounting gasket 2a may be interposed between the outer periphery of the pipe 2 and the flanges 18 and 19, as schematically shown in FIGS. 2 and 3.

Housing 17 may include a trackway defined by a horizontally extending channel 21. Channel 21 may extend through one side of the housing 17, as shown in FIGS. 1 and 3. Channel 21 includes an apertured portion or window 22 disposed in general axial alignment with the collimating passage 16. A calibration plate 23, which may be fabricated of lead, may be slidably mounted in the trackway 21. For calibration purposes, the plate 23 is moved out of the trackway 21 to position a calibrating shield portion 23a in axial alignment with the collimating passage 16. While density measurements are taking place, the plate 23 is maintained in its retracted position shown in FIG. 1, where a slide window 23b is aligned with the track window 22. A locking screw 21a serves to secure plate 23 in either the retracted or extended positions.

A tubular member 25 is mounted in housing 3. Tubular member 25 extends vertically upward from housing 3 in parallel alignment with the vertical longitudinal axis of the conduit 2.

A shielding lead mass 26 occupies the interior of housing 17, i.e., the void space not occupied by the tubular member 25, the slide 21 or the bar 23.

A waferlike portion 26a of shielding material 26 is interposed axially between the window 22 and the tubular conduit 25. This waferlike shielding portion 26a provides a blocking and attenuating shield operable against low energy level photons.

A scintillation crystal 27 is mounted within the lower end of the tube 25 in general axial alignment with the collimating passage 16 and the window 22. A photomultiplier unit 28 is mounted in the tube 25 immediately above the scintillation crystal 27. Thus, units 27 and 28, together provide scintillation counting means. The interface 29 between units 27 and 28 is occupied with a fluid operable to place the crystal 27 and the photomultiplier unit 28 in light, conductive relationship. The units 27 and 28 are ruggedly mounted by a unique shock absorbing arrangement, structural details of which will be later described.

A pump 30, schematically shown in FIG. 4, is operable to transmit a slurry through a conduit means 31, to the interior passage 32 of conduit 2, for upward, vertical movement through this passage.

The slurry transmitted to passage 31 is contemplated as being of the type used in the drilling industry, i.e., drilling mud, cement, etc.

It is further contemplated that this slurry may contain, as a dispersed solid constituent, a weighting agent such as barium sulphate or strontium sulphate.

As shown in FIG. 4, the photo-multiplier unit 28 is electrically coupled to a conventional indicating and/or recording unit 33.

CALIBRATION STRUCTURE

In describing the basic structure of the FIG. 1 apparatus, reference was made to a slide type of calibration assembly. For industrial applications, a calibration structure 34 such as that shown in FIGS. 6, 7 and 8 is preferred.

This calibration structure is incorporated in the shielding mass 7 between the photon source 4 and the interior passage 32 of the conduit 2 and in axial alignment with source 4 and crystal 27.

The calibration apparatus 34 includes a generally cylindrical housing 35 embedded within the shielding mass 7. A plug 36 is mounted in housing 35 for controlled, axial and rotary movement. A coil spring 37 biases plug 36 to an illustrated, first axial position. Spring 37 telescopingly encircles an operating rod 38 which projects from one end of the plug 36 and terminates in an operating knob 39. This handle means 39 is located exteriorly of the housing 3.

A rod 40 is carried by the plug 36. Each of the two abutment-like ends 40a of the rod 40 is slidably disposed in a plug movement control T-slot 41. With the plug biased to the first axial position illustrated in FIG. 6, each rod abutment 40a engages the free or left-most end of the leg portion 41a of its associated slot 41. Thus, the leg portion 41a of each T-slot provides a first constraining means which is operable to prevent rotation of the plug 36 as it moves from this first axial position to a second axial position. The second axial position is defined by engagement of the rod abutment 40a with the T-slot headwalls 41b. In this second axial position, the rod 40 may rotate through the T-slot head portions 41c, from a first rotary position defined by head slot extremities 41d, to a second rotary position defined by the other head slot extremities 41e.

Thus, the slot legs 41a provide first and second slot portions extending longitudinally of diametrically opposite wall portions of cylindrical housing 35. Slot head portions 41c provide third and fourth wall portions, communicating with the first and second slot portions, respectively, and extending circumferentially about generally diametrically opposite wall portions of cylinder 35.

A pair of windows 42 and 43 are carried by the housing 34 in axial alignment with the source 4. A frustoconical, collimating passage 44 is formed in the plug 36. This frustoconical passage 44 is axially aligned with the source 4 and the windows 42 and 43 when the plug is in the first axial position illustrated in FIG. 6.

As shown in FIGS. 6 and 8, a first calibration shield 45 is formed in plug 36. Shield 45 is axially displaced from collimating passage 44 and is defined by a waferlike portion 46 of plug 36 disposed between two transversely extending and radially spaced bores 47 and 48.

A second calibrating shield 49 is formed in plug 36 in general axial coincidence with the first shield 45. Second shield 49 is defined by the waferlike portion 46 between the bores 50 and 51.

As will be apparent by references to FIG. 8, the thickness of the shield 45 between the bores 47 and 48 is substantially less than the thickness of the shield 49 between the bores 50 and 51.

When the knob or handle 39 is pulled outwardly so as to move the rod 40 into the head slot portions 41c, and then rotated to the head slot ends 41d, the shield 49 is disposed in axial alignment with the source 4.

Conversely, when the knob is rotated to the head slot ends 41e, the shield 45 is disposed in axial alignment with the source 4 and the window means 42 and 43.

Thus, by appropriately manipulating the knob or handle 39, the plug 36 may be positioned so as to provide for the selective disposition of the collimating passage 44 or either of the different absorption capacitor calibrating shields in the path of photons issuing from the source 4.

The rod and T-slots cooperate to prevent rotary movement of the plug 36 while it is being moved axially of the housing 35 and to prevent axial movement of this plug while it is being rotated.

SHOCK RESISTANT MOUNTING FOR SCINTILLATION COUNTING UNIT

In oil field operations, vibrations of substantial magnitudes are often encountered. In order to avoid the deleterious effects of such vibrations, the scintillating crystal 27 and the photo-multiplier unit 28 have been mounted so as to be uniquely invulnerable to shocks as illustrated in FIGS. 1 and 4.

Crystal 27 is supported at its base by a resilient pad 52. An annular elastomeric gasket 53 is interposed between the crystal 27 and the photo-multiplier unit 28. This flange has a generally triangularly configured annular ledge 54. Gasket 53, and its ledge 54, serves to align units 27 and 28 with the oil in space 29 confined and disposed to light conductively couple units 27 and 28. Wedge 54 which projects radially between the outer edges of the mutually facing ends of units 27 and 28 serves to secure gasket 53 in alignment with the zone 29 and affords some shock absorbing between units 27 and 28. The upper end of the photo-multiplier unit 28 is engaged with an annular resilient shock absorbing ring 55.

Crystal 27, photo-multiplier unit 28 and the shock absorbing members 52, 53 and 55 are all contained within a separate mounting tube 56. Mounting tube 56 is contained within the housing 25 and is supported at its lower end of a shock absorbing elastomeric pad 57. Pad 57 provides an annular rim 58 interposed radially between the tubes 25 and 56 for shock absorbing purposes.

The upper end of tube 56 is cushioned by elastomeric means 59. Shock absorbing means 59 provides a shock absorbing portion 60 interposed axially between the housing 56 and the detachable cap 61 for housing 25. Shock absorbing means 59 also provides an annular shock absorbing portion 62 interposed radially between the tube 56 and the housing 25.

While tube 56 has been illustrated in a schematic format as a unitary member, it will be appreciated that this tube may be composite or sectional in nature. It will also be recognized that the shock absorbing means 59 may be defined by separate shock absorbing units instead of the unitary schematic structure. For example, an O-ring may define the shock absorbing means 62, while another O-ring defines the shock absorbing means 60. Inner tube 56 has a closed lower end and a detachable upper portion. The entire tube 56, and its contents, may be removed from housing 25 as an integral unit.

DIMENSIONAL AND COMPONENT CONSIDERATIONS

By way of example, the invention is specifically contemplated for use in the measurement of the density of cement or mud slurries of the type used in oil fields. Such slurries often include, as a finely divided solid constituent, barium sulphate or strontium sulphate.

In such slurries, where silicon or calcium is often the cation of the principal solid constituent, and barium sulphate or strontium sulphate is present as an additive, there is a wide range of atomic numbers with respect to the cations of the solid constituents. Silicon has an atomic number of 14 while calcium has an atomic number of 20, both of these elements thus being lower atomic numbered constituents of slurries. However, strontium has an atomic number of 38 while barium has an atomic number of 56. Thus, in most instances, there will be present in the slurry one solid constituent with a cation having an atomic number at least as low as about 20 and another constituent with a cation having an atomic number at least as high as about 38.

At this point it is appropriate to describe the characteristics of one preferred embodiment of the apparatus 1.

The source 4 comprises 10 mc. of cesium 137. This source is operable to emit photons having a substantially monoenergetic gamma ray energy level of .661 m.e.v.

The shielding material 7 is fabricated from sintered tungsten, while material 26 comprises lead. The gasket 2a is preferably fabricated of material such as neoprene which provides resiliency in the mounting of the housings 3 and 17 and thus tends to isolate the unit 1 from vibration.

The conduit 2 is fabricated from steel and has a 2½ inch inside diameter and a 3½ inch outside diameter. The resulting heavy wall thickness is useful in enabling the conduit 2 to handle high pressure slurry flows. Thus, conduit 2 may be viewed as an integral component of the unit 1.

The diameter of the collimator passage 16 at its constricted end 16a is in the order of ¼ inch. At its enlarged end 16b, the collimator passage has a diameter of ½ inch. The axial length of the collimator 16 is 1 inch.

The minimum thickness T of the lead shield 26a between the slurry passage 32 and the scintillation crystal 27 is 1 centimeter. The scintillation detector 27 is a 1 inch diameter by 2½ inches long, thallium activated, sodium iodide crystal (Harshaw type 4 PF 10). The photo-multiplier unit 28 comprises an EMI type 9524–S photo-multiplier tube. The oil in the interfacial space 29 within tube 56 is DC–200 silicone oil having a viscosity of $10^6$ centistokes.

The conduit 25 may comprise a steel tube having a 2⅛ inch outer diameter and a 1¹¹⁄₁₆ inch steel inner diameter.

The weight of the overall unit 1, excluding the weight of the conduit 2, is on the order of 48 pounds.

MODE OF OPERATION

Tests performed with this unit indicate that with different slurry compositions, the densitometer 1 maintains an accuracy such that deviations from actual density do not exceed about .25 pound per gallon. This level of deviation is well within that acceptable in field practice in the handling of cement slurries and mud slurries.

The energy level of cesium 137 source is within a range where the reaction of the gamma rays with the slurry is controlled almost entirely by photoelectric absorption and Compton scattering. Interaction of the photons with the slurry involving pair production interactions i.e., reaction of the photons with the electrical field of nuclei of the solid constituents of the slurry, is successfully suppressed.

This photon energy level is within the range where the balance between photoelectric absorption and Compton scattering is such as to substantially minimize dependence of the accuracy of unit 1 on any specific composition of the slurry whose density is being measured.

Turning to FIG. 5, it will be noted that in the energy range from about .6 to about 3 m.e.v., the mass absorption coefficients remain about the same even though there is a wide disparity in the atomic number of the cations of the solid constituents of the slurry. By maintaining the energy level of the primary photons emitted from source 4 greater than .6 but less than 2 m.e.v., this uniformity in mass absorption coefficient is maintained without producing the undesirable, pair production interaction.

Even though cesium 137 emits photons of a substantially constant energy level, Compton scattering phenomena within the slurry will produce photons of a substantially lower energy level. Such lower level photons, if their energy level is as low as .3 m.e.v., will produce substantial variations in mass absorption coefficient in relation to cations having substantially different atomic numbers. Lesser but still substantial deviations will be produced with low energy level photons having an energy level of about .45 m.e.v.

Thus, in order to avoid variations in mass absorption coefficients, which would result from the lower energy photons produced by multiple Compton scattering phenomena, it is desirable to impede the passage of such photons from the slurry chamber 22 to the scintillator crystal 27. Obviously such a shielding will inherently also impede the passage of some higher energy level photons. It thus becomes important to discover the acceptable level of photon blocking and attenuation which will still yield acceptable results from the successfully transmitted high energy photons.

It thus has been discovered that a barrier 26a of lead having a thickness of at least 1 centimeter but not exceeding about 1.5 centimeters is acceptable.

One centimeter of lead is effective to almost totally block the passage of photons having an energy level of .3 m.e.v. or less. This same thickness of lead is effective to attenuate the passage of photons having an energy level of .45 or less to a degree equal to at least about twice the extent of attenuation of the primary photons whose energy level exceeds .6 m.e.v.

While the shield 26a will successfully block or attenuate the passage of low energy level photons which would tend to introduce errors, there still remains the problem of stability of the scintillation counting means comprising the crystal 27 and the photocell 28.

One would normally think that with the lower level energy photons blocked or attenuated it would be reasonable to operate the scintillation counting means at a level where this counting means would count only the high energy level photons. However, it has been discovered that it is substantially more desirable to reduce the discrimination level of the scintillation counting means to at least about .05 m.e.v. With the cesium 137 emitter, the sodium iodide crystal, and the photo-multiplier unit previously described, an anode voltage supply for the photo-multiplier tube at a level of 1100 volts provides a discrimination level of .05 m.e.v. With this discrimination level, operable to count photons having an energy level at least as great as .05 m.e.v., the photo-multiplier cell operates on a plateau of maximum stability. With the photo-multiplier cell operating at this anode voltage, each change of one volt produces a change in counting rate of only about .018 percent. Further, this stability persists over an anode voltage range extending from about 1000 volts to about 1200 volts.

With these defined relationships existing between the photon energy source, shield 26a and the stability level of scintillation counter, unusually accurate density measurements are obtained for slurries of widely varying compositions. In general this system produces an accuracy deviating from actual density which does not exceed about .3 pound per gallon. For the most part, accuracies are within .25 pound per gallon for aqueous slurries of the type usually employed in well cementing and servicing operations.

GENERAL ADVANTAGES AND SCOPE OF INVENTION

A foremost discovery of the invention resides in recognizing that, with slurries having the disclosed variations in atomic numbers for solid constituent cations, the disclosed degree of attenuation and blocking of low energy level photons, coupled with the described high energy range of source photons, will yield densitometer accuracy so high as to obviate the necessity of recalibration for changes in slurry concentrations.

Thus a principal advantage of the invention resides in the ability of the unit to produce acceptable density measurement accuracy over a wide constituent range without requiring recalibration of the unit.

Another major advantage results in the substantial reduction in the weight of the unit, as compared with many nuclear densitometers commercially employed.

Also noteworthy is the extreme stability of the scintillation counting means over a wide range of anode voltage changes, as well as its uniquely rugged, but simple mounting.

The unique, T-slot controlled, calibration unit provides a highly effective, yet simple, mechanism for calibrating the instrument. The T-slot, coupled with the biasing spring, provides positively controlled means for positioning a plug for diverse calibration operations or slurry density measurements while positively indicating to an operator the position of the calibration plug.

In describing the invention, reference has been made to preferred embodiments. However, those skilled in the art and familiar with this disclosure may envision additions, deletions, substitutions or other modifications which would fall within the purview of the invention as defined in the appended claims.

We claim:

1. A method of measuring the densities of slurries of the type used in well operations, said method comprising:
    positioning a source of high energy level photons adjacent a vertical flow of a slurry, said slurry comprising diverse solid materials, with one solid material of said slurry having a cation with a relatively high atomic number, at least as high as about 38, and another solid material having a cation with a relatively low atomic number, at least as low as about 20;

collimating the emission of photons from said source en route to said slurry;

blocking and attenuating the passage of photons issuing from said slurry which have a relatively low photon energy level;

impinging relatively high energy level photons which have been subjected to said blocking and attenuating on scintillation counting means; and operating said scintillation counting means within a range of maximum stability;

said positioning, blocking and attenuating, and impinging being cooperable, independent of recalibration, to enable said scintillation counting means to indicate densities of slurries of varying composition wherein the relative amounts of said constituents having atomic numbers as high as about 38 and as low as about 20 may vary substantially, with the densities of said slurries of varying composition being indicated with deviations from actual slurry density which do not exceed about .3 pound per gallon.

2. A method of measuring the densities of slurries of the type used in well operations, said method comprising:

positioning a source of photons having a photon energy of between about .6 and about .2 m.e.v. adjacent a vertical flow of a slurry, said slurry comprising diverse solid materials, with one solid material of said slurry having a cation having an atomic number at least as high as about 38 and another solid material having a cation with an atomic number at least as low as about 20;

collimating the emission of photons from said source en route to said slurry;

substantially blocking the passage of photons issuing from said slurry which have a photon energy level of less than about .3 m.e.v.;

attenuating the passage of photons issuing from said slurry having a photon energy level of less than about .45 m.e.v. by at least twice the degree of attenuation of photons issuing from said slurry which have a photon energy level of about .6 m.e.v. or greater;

impinging photons which have been subjected to said blocking and attenuating on scintillation counting means; and maintaining a lower discrimination level of said scintillation counting means at least as low as about .05 m.e.v.;

said positioning, blocking, attenuating, and impinging being cooperable, independent of recalibration, to enable said scintillation counting means to indicate densities of slurries of varying composition wherein the relative amounts of said constituents having atomic numbers as high as about 38 and as low as about 20 may vary substantially, with the densities of said slurries of varying composition being indicated with deviations from actual slurry density which do not exceed about .3 pound per gallon.

3. A method of measuring the densities of slurries of the type used in well operations, said method comprising:

positioning a $C_s$ 137 source of photons having a photon energy of about .661 m.e.v. adjacent a vertical flow of a slurry, said slurry comprising diverse solid materials, with one solid material of said slurry having a cation having an atomic number at least as high as about 40 and another solid material having a cation with an atomic number at least as low as about 20;

collimating the emission of photons from said source en route to said slurry;

substantially blocking the passage of photons issuing from said slurry which have a photon energy level of less than about .3 m.e.v.;

attenuating the passage of photons issuing from said slurry having a photon energy level of less than about .45 m.e.v. by at least twice the degree of attenuation of photons issuing from said slurry which have a photon energy level of about .6 m.e.v. or greater;

impinging photons which have been subjected to said blocking and attenuating on a thallium activated sodium iodide crystal;

detecting photon induced scintillation in said crystal with photomultiplier means; and operating said photomultiplier means with an applied anode voltage operable to maintain a lower discrimination level of about .05 m.e.v., with said anode voltage being in a range where a change of one volt produces a change in counting rate not exceeding about .018 percent;

said positioning, blocking, attenuating, and impinging being cooperable, independent of recalibration, to enable said photomultiplier means to indicate densities of slurries of varying composition wherein the relative amounts of said constituents having atomic numbers as high as about 40 and as low as about 20 may vary substantially, with the densities of said slurries of varying composition being indicated with deviations from actual slurry density which do not exceed about .3 pound per gallon.

4. Apparatus for measuring the density of a slurry, said apparatus comprising:

vertical conduit means;

first housing means mounted on one side of said vertical conduit means;

a source of high energy gamma rays positioned within and shielded by said first housing means;

collimating passage means controlling the emission of gamma rays from said source en route to the interior of said vertical conduit means;

second housing means carried by said vertical conduit means generally opposite said first housing means;

a gamma ray shield interpositioned in the path of photons issuing from said conduit subsequent to passing through a slurry flowing through said conduit, said shield having a material density and thickness operable to substantially block and attenuate the passage of relatively low energy level photons;

tubing means mounted in said second housing means and projecting vertically upwardly therefrom in generally parallel relationship with said conduit means;

said shield being interposed between said tubing means and said slurry;

scintillating counting means positioned within said tubing means in the path of photons transmitted through said shield;

control means maintaining the discrimination level of said scintillating counting means at a level where said scintillating counting means operates at maximum stability;

means operable to transmit through said conduit means a slurry having at least two diverse solid materials, with one of said solid materials having a cation with a relatively high atomic number and another of said materials having a cation with a relatively low atomic number;

calibrating means, said calibrating means including:
generally cylindrical means mounted in said first housing means,
plug means mounted in said cylindrical means for axial and rotary movement,
resilient means biasing said plug means within said cylindrical means to a first axial position,
handle means engaged with said plug means and operable to move said plug means against the biasing influence of said resilient means to a second axial position, first constraining means between said plug means and said cylindrical means operable to prevent relative rotary movement between said plug means and said cylindrical means while said plug means moves from said first axial position to said second axial position, second constraining means between said plug means and said cylindrical means operable at said second axial position to enable said plug means to rotate from a first rotary position to a second rotary position and prevent axial movement of said plug at said first rotary position or said second rotary position, window means carried by said cylindrical means and operable to transmit photons through said cylindrical means, generally frustoconical passage means defining said collimating passage means and formed in said plug means, said passage means being operable to be aligned with said window means when said plug means is in said first axial position, first shield means formed in said plug means and displaced axially from said collimating passage means, said first shield means being operable to be aligned with said window means when said plug means is disposed in said first rotary position, and second shield means generally axially aligned but circumferentially displaced from said first shield means, said second shield means having a photon absorption capacity different from that of said first shield means and being operable to be aligned with said window means when said plug means is disposed in said second rotary position; and shock absorbing mounting means for said scintillation counting means, said shock absorbing means including inner housing means disposed within said tubing means, said scintillation counting means being disposed within said inner housing means, first shock absorbing means disposed axially between said scintillation counting means and said inner housing means, second shock absorbing means interposed radially between said scintillation counting means and said inner housing means, third shock absorbing means interposed axially between said inner housing means and said tubing means, and fourth shock absorbing means interposed radially between said inner housing means and said tubing means.

5. Apparatus for calibrating a nuclear densitometer, said apparatus comprising:

generally cylindrical housing means;

plug means mounted in said housing means for axial and rotary movement;

resilient means biasing said plug means within said housing means to a first axial position;

handle means engaged with said plug means and operable to move said plug means against the biasing influence of said resilient means to a second axial position;

constraining means between said plug means and said housing means operable to prevent relative rotary movement between said plug means and said housing means while said plug means moves from said first axial position to said second axial position;

window means carried by said housing means and operable to transmit photons through said housing means;

generally frustoconical collimating passage means formed in said plug means and operable to be aligned with said window means when said plug means is in said first axial position; and shield means formed in said plug means and displaced axially from said collimating passage means, said first shield means being operable to be aligned with said window means when said plug means is disposed in rotary alignment with said second axial position.

6. Apparatus for calibrating a nuclear densitometer, said apparatus comprising:

generally cylindrical housing means;

plug means mounted in said housing means for axial and rotary movement;

resilient means biasing said plug means within said housing means to a first axial position;

handle means engaged with said plug means and operable to move said plug means against the biasing influence of said resilient means to a second axial position;

first constraining means between said plug means and said housing means operable to prevent relative rotary movement between said plug means and said housing means while said plug means moves from said first axial position to said second axial position;

second constraining means between said plug means and said housing means operable at said second axial position to enable said plug means to rotate from a first rotary position to a second rotary position and prevent axial movement of said plug at said first rotary position or said second rotary position;

window means carried by said housing means and operable to transmit photons through said housing means;

generally frustoconical collimating passage means formed in said plug means and operable to be aligned with said window means when said plug means is in said first axial position;

first shield means formed in said plug means and displaced axially from said collimating passage means, said first shield means being operable to be aligned with said window means when said plug means is disposed in said first rotary position; and second shield means generally axially aligned but circumferentially displaced from said first shield means, said second shield means having a photon absorption capacity different from that of said first shield means and being operable to be aligned with said window means when said plug means is disposed in said second rotary position.

7. Apparatus for calibrating a nuclear densitometer, said apparatus comprising:

generally cylindrical housing means;

plug means mounted in said housing means for axial and rotary movement;

a coil spring biasing said plug means within said housing means to a first axial position;

handle means engaged with said plug means and operable to move said plug means against the biasing influence of said coil spring to a second axial position;

said handle means comprising a rod extending axially from said plug means and passing telescopingly through said coil spring;

first constraining means between said plug means and said housing means operable to prevent relative rotary movement between said plug means and said housing means while said plug means moves from said first axial position to said second axial position;

said first constraining means comprising first and second slot means formed in diametrically opposite wall portions of said housing means and extending longitudinally thereof and first and second abutment means carried by said plug means and guidingly received within said first and second slot means, respectively;

second constraining means between said plug means and said housing means operable at said second axial position to enable said plug means to rotate from a first rotary position to a second rotary position and prevent axial movement of said plug at said first rotary position or said second rotary position;

said second constraining means comprising third and fourth slot means formed in generally diametrically opposite wall portions of said housing means, extending circumferentially about said wall portions, communicating with said first and second slot means respectively and guardingly receiving said first and second abutment means;

window means carried by said housing means and operable to transmit photons through said housing means;

generally frustoconical collimating passage means formed in said plug means and operable to be aligned with said window means when said plug means is in said first axial position;

first shield means formed in said plug means and displaced axially from said collimating passage means, said shield means being operable to be aligned with said window means when said plug means is disposed in said first rotary position; and second shield means generally axially aligned but circumferentially displaced from said first shield means, said second shield means having a photon absorption capacity different from that of said first shield means and being operable to be aligned with said window means when said plug means is disposed in said second rotary position.

8. A method of measuring the densities of liquids of the type used in well operations, said method comprising:

positioning a source of photons having a photon energy of between about .6 and about 2 m.e.v., adjacent a flow of a liquid, said liquid comprising diverse components, with one component of said liquid having a cation having an atomic number at least as high as about 38 and another component having a cation with an atomic number at least as low as about 20;

collimating the emission of photons from said source en route to said liquid;

substantially blocking the passage of photons issuing from said liquid which have a photon energy level of less than about .3 m.e.v.;

attenuating the passage of photons issuing from said liquid having a photon energy level of less than about .45 m.e.v. by at least twice the degree of attenuation of photons issuing from said liquid which have a photon energy level of about .6 m.e.v. or greater;

impinging photons which have been subjected to said blocking and attenuating on scintillation counting means; and maintaining a lower discrimination level of said scintillation counting means at least as low as about .05 m.e.v.;

said positioning, blocking, attenuating, and impinging being cooperable, independent of recalibration, to enable said scintillation counting means to indicate densities of liquids of varying composition wherein the relative amounts of said constituents having atomic numbers as high as about 38 and as low as about 20 may vary substantially, with the densities of said liquids of varying composition being indicated with deviations from actual liquid density which do not exceed about .3 pound per gallon.

9. A method of measuring the densities of media of the type used in well operations, said method comprising:

positioning a source of high energy level photons adjacent a flow of a media, said media comprising diverse components, with one component of said media having a cation with a relatively high atomic number, at least as high as about 38, and another component having a cation with a relatively low atomic number, at least as low as about 20;

blocking and attenuating the passage of photons issuing from said media which have a relatively low photon energy level;

impinging relatively high energy level photons which have been subjected to said blocking and attenuating on scintillation counting means; and operating said scintillation counting means within a range of maximum stability;

said positioning, blocking and attenuating, and impinging being cooperable, independent of recalibration, to enable said scintillation counting means to indicate densities of media of varying composition wherein the relative amounts of said constituents having atomic numbers as high as about 38 and as low as about 20 may vary substantially, with the densities of said media of varying composition being indicated with deviations from actual media density which do not exceed about .3 pound per gallon.

10. A method of measuring the densities of media of the type used in well operations, said method comprising:

positioning a course of photons having a photon energy of between about .6 and about 2 m.e.v. adjacent a flow of a media, said media comprising diverse components, with one component of said media having a cation having an atomic number at least as high as about 38 and another component having a cation with an atomic number at least as low as about 20;

collimating the emission of photons from said source en route to said media;

substantially blocking the passage of photons issuing from said media which have a photon energy level of less than about .3 m.e.v.;

attenuating the passage of photons issuing from said media having a photon energy level of less than about .45 m.e.v. by at least twice the degree of attenuation of photons issuing from said media which have a photon energy level of about .6 m.e.v. or greater;

impinging photons which have been subjected to said blocking and attenuating or scintillation counting means; and maintaining a lower discrimination level of said scintillation counting means at least as low as about .05 m.e.v.;

said positioning, blocking, attenuating, and impinging being cooperable, independent of recalibration, to enable said scintillation counting means to indicate densities of media of varying composition wherein the relative amounts of said constituents having atomic numbers as high as about 38 and as low as about 20 may vary substantially, with the densities of said media of varying composition being indicated with deviations from actual media density which do not exceed about .3 pound per gallon.

11. A method of measuring the densities of liquids of the type used in well operations, said method comprising:

positioning a source of high energy level photons adjacent a flow of a fluid, said fluid comprising diverse components, with one component of said fluid having a cation with a relatively high atomic number at least as high as about 38 and another component having a cation with a relatively low atomic number at least as low as about 20;

collimating the emission of photons from said source en route to said fluid;

block and attenuating the passage of photons issuing from said fluid which have a relatively low photon energy level;

impinging relatively high energy level photons which have been subjected to said blocking and attenuating on scintillation counting means; and operating said scintillation counting means within a range of maximum stability;

said positioning, blocking and attenuating, and impinging being cooperable, independent of recalibration, to enable said scintillation counting means to indicate densities of liquids of varying composition wherein the relative amounts of said constituents having atomic numbers as high as about 38 and as low as about 20 may vary substantially, with the densities of said liquids of varying composition being indicated with deviations from actual liquid density which do not exceed about .3 pound per gallon.

References Cited

UNITED STATES PATENTS

| | | | |
|---|---|---|---|
| 2,862,106 | 11/1958 | Scherbatskoy | 250—71.5 |
| 2,965,753 | 12/1960 | Reynolds et al. | 250—43.5 |
| 3,070,692 | 12/1962 | Ohmart et al. | 250—43.5 |
| 3,247,377 | 4/1966 | Hall | 250—71.5 |
| 3,248,541 | 4/1966 | Crump | 250—43.5 |
| 3,258,593 | 6/1966 | Reed et al. | 250—71.5 |

RALPH G. NILSON, Primary Examiner

D. L. WILLIS, Assistant Examiner

U.S. Cl. X.R.

250—71.5